(12) United States Patent
Aoyagi

(10) Patent No.: US 7,723,873 B2
(45) Date of Patent: May 25, 2010

(54) VIBRATION ACTUATOR

(75) Inventor: Tomohide Aoyagi, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 122 days.

(21) Appl. No.: 11/915,676

(22) PCT Filed: Jun. 29, 2006

(86) PCT No.: PCT/JP2006/312954

§ 371 (c)(1),
(2), (4) Date: Nov. 27, 2007

(87) PCT Pub. No.: WO2007/001042

PCT Pub. Date: Jan. 4, 2007

(65) Prior Publication Data

US 2009/0199644 A1    Aug. 13, 2009

(30) Foreign Application Priority Data

Jun. 29, 2005    (JP) .............................. 2005-189142

(51) Int. Cl.
*H02K 41/00* (2006.01)
(52) U.S. Cl. ..................... 310/12.01; 310/13; 310/15
(58) Field of Classification Search ............. 310/12–15, 310/23, 26–28; 318/128
See application file for complete search history.

(56) References Cited

U.S. PATENT DOCUMENTS

| 5,107,155 A | | 4/1992 | Yamaguchi |
| 5,231,336 A | * | 7/1993 | van Namen ................. 318/128 |
| 5,231,337 A | * | 7/1993 | van Namen ................. 318/128 |
| 5,682,069 A | * | 10/1997 | Phillips et al. ............... 310/51 |
| 5,682,132 A | * | 10/1997 | Hiroyoshi et al. .......... 340/407.1 |
| 2003/0117223 A1 | | 6/2003 | Shimoda et al. |

FOREIGN PATENT DOCUMENTS

| EP | 1 599 065 | | 11/2005 | |
| JP | 59059064 A | * | 4/1984 | ................ 310/12 |
| JP | 5-028464 | | 4/1993 | |

(Continued)

OTHER PUBLICATIONS

International Search Report for PCT/JP2006/312954 Dated Jul. 18, 2006.

*Primary Examiner*—Quyen Leung
*Assistant Examiner*—Leda Pham
(74) *Attorney, Agent, or Firm*—Studebaker & Brackett PC; Donald R. Studebaker

(57) ABSTRACT

A vibration actuator having a simple small-sized structure capable of obtaining vibration enough to sense without use of suspension or the like is provided.

Amplitude of a moving part is restrained by a magnetic gap formed by cup-shaped yokes which are formed to interpose a magnet, and the moving part is vibrated without collision of the moving part with an inner wall of a fixed part. Therefore, magnetic force exerted between the moving part and the fixed part is allowed to function as a suspension. Therefore, it is possible to solve a problem, that is, reduction in the amplitude caused from the suspension. In addition, an air damper structure that air in upper and lower space of the moving part is used as a damper is provided, so that it is possible to obtain a wide frequency band.

7 Claims, 7 Drawing Sheets

FOREIGN PATENT DOCUMENTS

| | | |
|---|---|---|
| JP | 2530518 | 9/1996 |
| JP | 2003-154314 | 5/2003 |
| JP | 2003-174759 | 6/2003 |
| JP | 2004-202424 | 7/2004 |
| JP | 2004-266384 | 9/2004 |

* cited by examiner

VIBRATION ACTUATOR

TECHNICAL FIELD

Currently, in a mobile communication apparatus such as a cellular phone, a function of notifying a user of receiving of a call signal is built and used. As an example of a vibration actuator for carrying out the function, a vibration motor having an eccentric means provided to a rotational shaft of the motor so as to generate vibration is disclosed in Japanese Patent No. 2530518.

In the vibration motor, the eccentric means is provided inside a housing, so that there is no need to form a gap for preventing contact of a weight to an attached board during a driving period and collision of the rotating weight with other parts at the time of attaching to the board.

In addition, in the vibration motor, rotation of a built-in magnet is transferred to an eccentric shaft bearing provided to the rotational shaft, so that the vibration is obtained. Therefore, there is no need for expensive members such as tungsten alloy, and thus, there is an advantage in terms of cost.

As described above, in the vibration motor, the vibration is obtained by using the eccentric means provided to the rotational shaft.

For this reason, as a diameter of the motor becomes smaller and smaller, there is a problem in that an amount of vibration is needed to be maintained by increasing the number of rotation of the eccentric means.

In order to solve the problem, vibration actuators are disclosed in Japanese Utility Model Application Laid-Open No. 05-28464 and Japanese Patent Application Laid-Open No. 2003-154314. In the vibration actuator disclosed in Japanese Utility Model Application Laid-Open No. 05-28464, a magnet is vibrated by magnetic force exerted between the magnet and a coil disposed around the magnet.

In the vibration actuator disclosed in Japanese Patent Application Laid-Open No. 2003-154314, a magnet is vibrated by Lorentz force exerted between a coil disposed at a central portion and the magnet disposed around the coil.

In comparison to the structure that the eccentric weight is vibrated, in the aforementioned structure that the magnet is directly vibrated, the amount of vibration can be further increased so that vibration enough for a user to sense can be obtained.

In addition, since a simple structure is used, it is possible to easily implement a small-sized vibration actuator. In addition, since a vibration direction is aligned to be perpendicular to the attached board, a user can easily sense the vibration.

However, in a case where the vibration actuator in which the magnet is supported by a suspension is formed to be in a small size or thin, the vibration actuator has a problem in that the vibration is restrained by the suspension.

In addition, in a process of implementing the small-sized vibration actuator, the suspension cannot be easily assembled to vibration parts. As a result, it is difficult to reduce production cost.

Therefore, an object of the present invention is to provide a vibration actuator which is capable of being easily assembled with a simple structure and in which vibration is not restrained even if the vibration actuator is formed to be thin.

Patent Document 1: Japanese Patent No. 2530518
Patent Document 1: Japanese Patent Application Laid-Open No. 04-183240
Patent Document 2: Japanese Patent Application Laid-Open No. 2003-154314
Patent Document 3: Japanese Utility Model Application Laid-Open No. 05-28464

DISCLOSURE OF THE INVENTION

Means for Solving the Problems

According to the invention disclosed in Claim 1, there is provided a vibration actuator comprising a moving part which has a plate-shaped magnet magnetized in a vibration direction in a housing case and of which movable range is restrained to the vibration direction by a means such as a guide shaft, a field coil, and a coil yoke made of a magnetic material, wherein the field coil and the coil yoke are disposed on an outer surface of the magnet, wherein the coil and the coil yoke are disposed to generate a single magnetic pole around a central portion of amplitude of the moving part during a period that a current flows through the coil, wherein the moving part having the plate-shaped magnet is vibrated by interaction between a magnetic field generated by the coil and a magnetic field generated by the magnet, wherein the moving part having the plate-shaped magnet includes two cup-shaped magnet yokes made of a magnetic material, and wherein, the two magnet yokes which are formed to interpose the magnet to form a magnetic gap, so that the amplitude of the moving part is restrained.

According to the invention disclosed in Claim 2, in the vibration actuator according to Claim 1, the magnet yoke has a protrusion which is formed to protrude from an outer circumferential portion of the plate-shaped magnet to an outer side.

According to the invention disclosed in Claim 3, in the vibration actuator according to Claim 1 or 2, the coil disposed around the moving part has a plate-shaped coil yoke which is made of magnetic material.

According to the invention disclosed in Claim 4, in the vibration actuator according to any one of Claims 1 to 3, a thickness of the magnetic gap formed in the two cup-shaped yokes is 30% to 70% of the thickness of the plate-shaped magnet.

According to the invention disclosed in Claim 5, in the vibration actuator according to any one of Claims 1 to 4, a flow rate of the air is restrained by adjusting an interval between the outer circumferential portion of the yoke and an inner wall of the housing which receives the moving part or between the outer circumferential portion of the yoke and an inner wall of the coil.

EFFECT OF THE INVENTION

According to the invention disclosed in Claim 1, it is possible to implement a small-sized vibration actuator by using a simple structure without restraint of vibration caused from the miniaturization.

In the vibration actuator according to the present invention, since the yokes are formed to interpose the magnet so as to form the magnetic gap, a magnetic flux can be concentrated on an end portion of each yoke, the moving part having the magnet and the yokes is vibrated by magnetic force exerted between the end portion of the yoke on which the magnetic flux is concentrated and the field coil disposed around an outer surface of the magnet.

For this reason, the magnetic gap is formed so that the moving part cannot be in contact with the inner wall of the housing in the vibration direction. Therefore, the moving part can be vibrated without collision with the inner wall during the driving. Accordingly, it is possible to solve the problem of the aforementioned conventional vibration actuator, that is, the restraint of amplitude caused from the suspension.

In addition, in the moving part, the moving part can be stabilized by magnetic force exerted between the yoke provided to the moving part and the coil yoke made of a magnetic material, so that the moving part can be maintained in a horizontal state with respect to a bottom of the vibration actuator.

For this reasons when a current is applied, the magnetic flux is concentrated on the coil yoke in the horizontal state of the moving part, so that it is possible to obtain vibration having a fast startup without a load on a guide shaft or the like.

In addition, similar to the aforementioned conventional vibration actuator, in the vibration actuator according to the present invention, the vibration is generated in a direction perpendicular to the attached board, so that vibration which a user can easily sense is obtained from a small-sized vibration actuator.

According to the invention disclosed in Claim 2, although the size of the magnet is changed, it is possible to obtain the same effect as that of the vibration actuator disclosed in Claim 1 by the yoke.

According to the invention disclosed in Claim 3, the field coil disposed to generate a single magnetic pole around the central portion of the amplitude can prevent leakage of magnetic flux to the coil yoke which is disposed in the same manner, so that it is possible to improve magnetic efficiency.

According to the invention disclosed in Claim 4, in the vibration actuator disclosed in any one of Claims 1 to 3, a thickness of the magnetic gap is set to 30% to 70% of the thickness of the magnet, so that the vibration actuator can be designed to prevent collision of the moving part with the inner wall of the fixed part and to generate vibration enough for a user to sense during the driving.

According to the invention disclosed in Claim 5, in the vibration actuator disclosed in any one of Claims 1 to 4, air flow in an inner portion of the vibration actuator can be restrained, so that the air in upper and lower spaces of the moving part can be used as a damper. Accordingly, it is possible to obtain a flat vibration characteristic.

BEST MODE FOR CARRYING OUT THE INVENTION

Hereinafter, vibration actuators according to the embodiments of the present invention are described with reference to the accompanying drawings.

First Embodiment

FIGS. 1 to 6 are cross-sectional views illustrating vibration actuators according to first and second embodiments of the present invention.

The vibration actuator according to the embodiments includes a fixed part comprising a cup-shaped cylindrical case 1, a coil yoke 4 and a coil 3 which are disposed on an inner wall of the case 1 as shown in FIG. 1, a moving part comprising a cylindrical magnet 5, a weight 9 disposed on an inner surface of the magnet 5, and magnet yokes 6 and 6' which are disposed above and below the magnet 5 to form a magnetic gap as shown in FIG. 2, a shaft 2 which penetrates the moving part through a shaft bearing 7 to restrain a moving direction of the moving part to a vibration direction and of which one end is fastened to the case 1, and a cover 8 which fastens the other end of the shaft 2 and covers an opening of the case.

FIG. 3 illustrates a formation of the fixed part of the vibration actuator according to the first embodiment of the present invention. In the fixed part according to the embodiment, upper and lower coils 3 and 3' are disposed to interpose a ring-shaped coil yoke 4 made of a magnetic material.

A driving current is applied so that the two upper and lower coils 3 and 3' are repulsed each other. Therefore, a single magnetic pole is concentrated on the coil yoke 4 of the fixed part. In addition, a magnetic gap is formed by the magnet yoke 6 of the moving part. Accordingly, magnetic force is exerted between the magnetic poles concentrated on the both ends of the magnetic gap and the coil yoke 4. As a result, the moving part is vibrated.

In the embodiment, amplitude of the moving part is restrained by a width of the magnetic gap so that collision of the moving part in the vibration direction does not occur during the vibration. For this reason, a suspension or the like for supporting the moving part is not needed, and during a period that a current does not flow, the movement of the moving part is restrained by the magnetic force exerted between the coil yoke 4 (magnetic material) and the magnet yoke 6.

In addition, in the embodiment, an air damper structure is provided. In the air damper structure, an interval between the moving part and the inner wall of the fixed part is maintained in a range of 0 to 2.5% of an inner diameter of the fixed part by using the shaft 2, so that the air flow in upper and lower spaces of the moving part can be restrained and the air of the upper and lower spaces can be used as a damper during the driving period. Since the suspension or the like is not used, a good start characteristic can be obtained. In addition, since the air damper structure is used, a flat vibration characteristic can be obtained.

As described above, according to the first embodiment, it is possible to obtain a thin vibration actuator having a good startup characteristic without restraint of the amplitude caused from the suspension or the like.

Second Embodiment

FIG. 4 illustrates a formation of the fixed part of the vibration actuator according to the second embodiment of the present invention. In the embodiment, four coils 3 are disposed around the moving part. Each coil 3 is formed to wind around a plate-shaped coil yoke 4 made of a magnetic material. Unlike the first embodiment, it is possible to obtain an advantage that the coils are not repulsed each other.

Similar to the first embodiment, in this embodiment, the vibration actuator has a stabilized structure of a moving part by using the magnetic force exerted between the magnet yoke 6 and the coil yoke 4 when an input signal is off, therefore the movement of the moving part is restrained by the magnetic force when an input signal is off. In addition, in the embodiment, the air damper structure is also provided. In the air damper structure, an interval between the moving part and the inner wall of the fixed part is maintained in a range of 0 to 2.5% of an inner diameter of the fixed part, so that the air of the upper and lower spaces can be used as a damper.

Due to the air damper structure, it is possible to implement the vibration actuator having the flat vibration characteristic.

Referring to the coil yoke of the vibration actuators according the aforementioned two embodiments, upper and lower portions and an outer side surface of the coil 4 are covered with a plate-shaped magnetic material having cross sections of shaft shown in (1), (2), and (3) of FIG. 5(*b*). Accordingly, leakage of magnetic flux to an exterior of the coil can be reduced, so that magnetic efficiency can be improved.

In addition, in the same technical point of view, only an end portion 6*a* of the magnet yoke may be formed to protrude as shown in FIG. 6, so that the interval between the fixed part and the moving part can be adjusted.

As seen from the frequency characteristic α of the vibration actuator according to the embodiment and the frequency characteristic β of the conventional vibration actuator, the vibration actuator according to the present invention can maintain an amount of vibration in a wider frequency band than the conventional vibration actuator. Therefore, it is possible to obtain an advantage that the vibration actuator built in a mobile communication apparatus can be easily controlled.

As described above, it is possible to implement a thin vibration actuator capable of being assembled in a simple structure without restraint of amplitude caused from the suspension or the like.

REFERENCE NUMERALS

Figure 1:
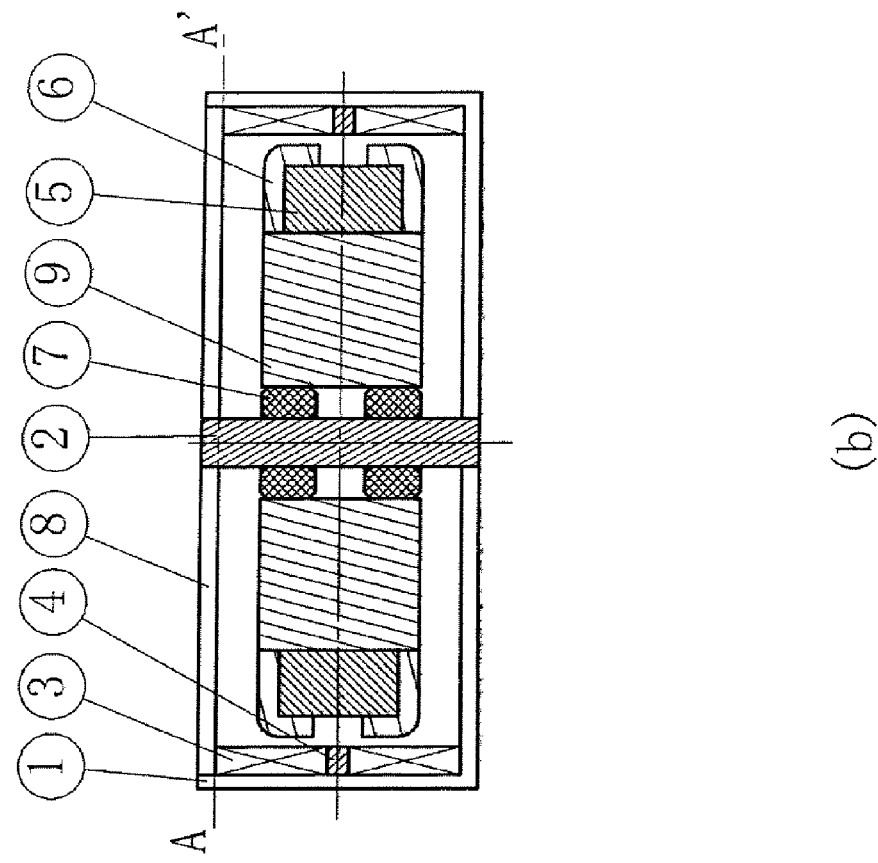
FIGS. 1A-1B are a cross-sectional view illustrating a vibration actuator according to first and second embodiments of the present invention.
Figure 1:
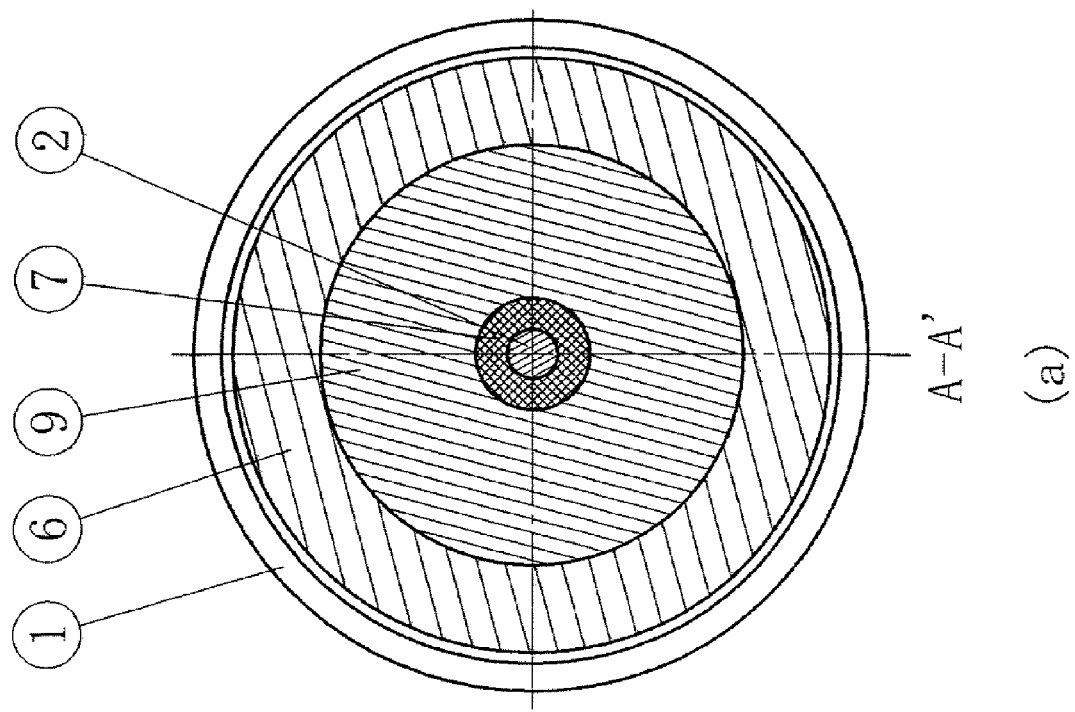
Figure 2:
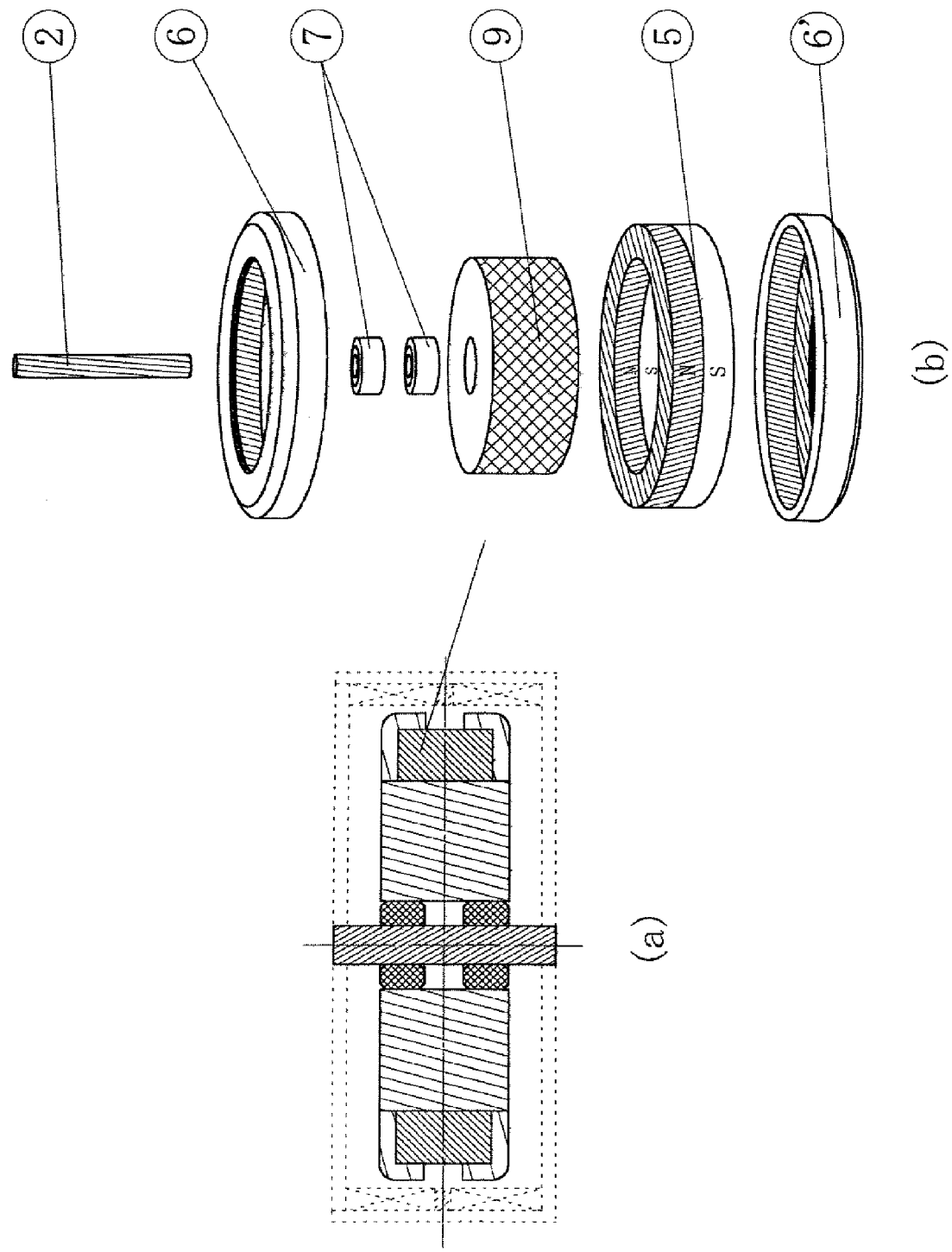
FIGS. 2A-2B illustrates a component formation of a moving part of the vibration actuator according to the first and second embodiments of the present invention.
Figure 3:
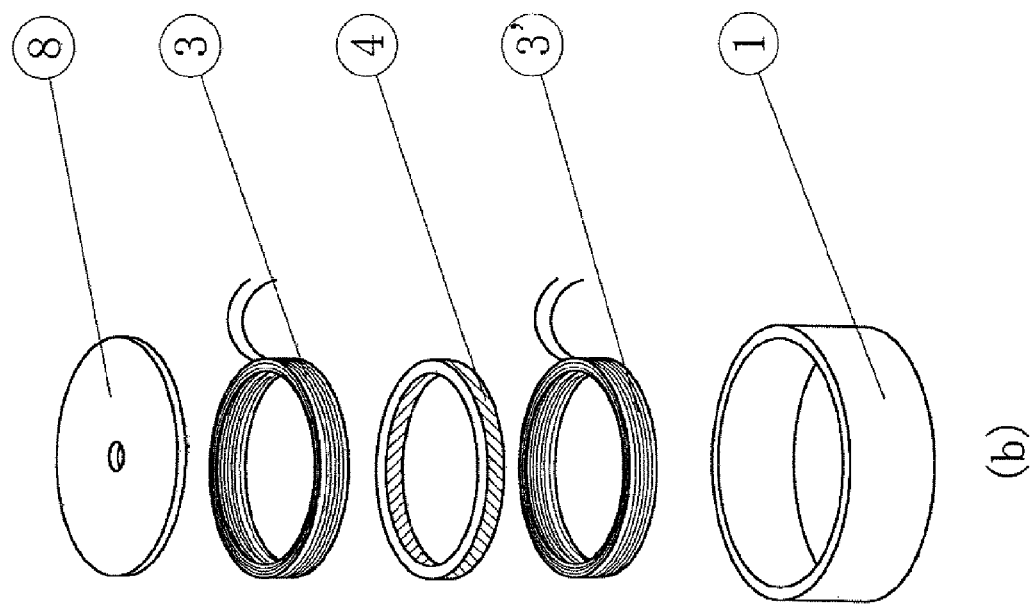
FIGS. 3A-3B illustrates a formation of a coil of the vibration actuator according to the first embodiment of the present invention.
Figure 3:
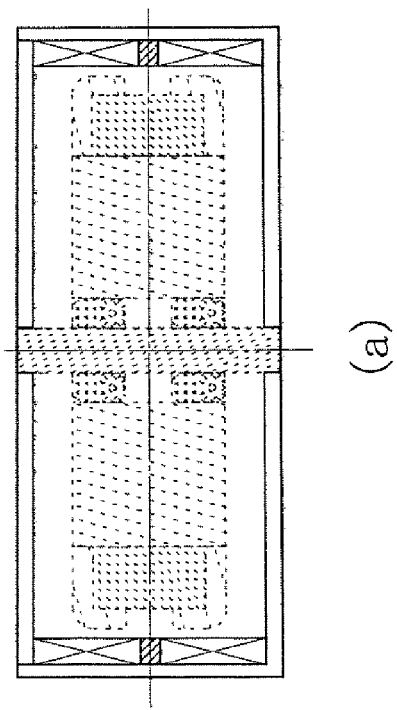
Figure 4:
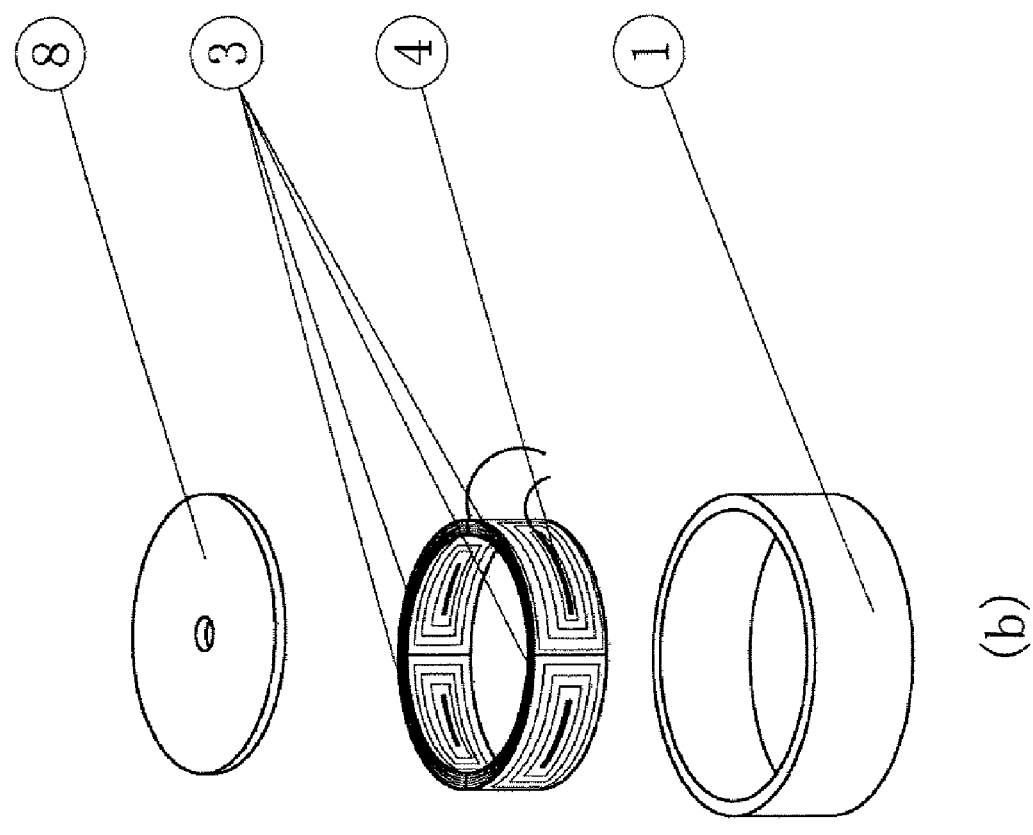
FIGS. 4A-4B illustrates a formation of a coil of the vibration actuator according to the second embodiment of the present invention.
Figure 4:
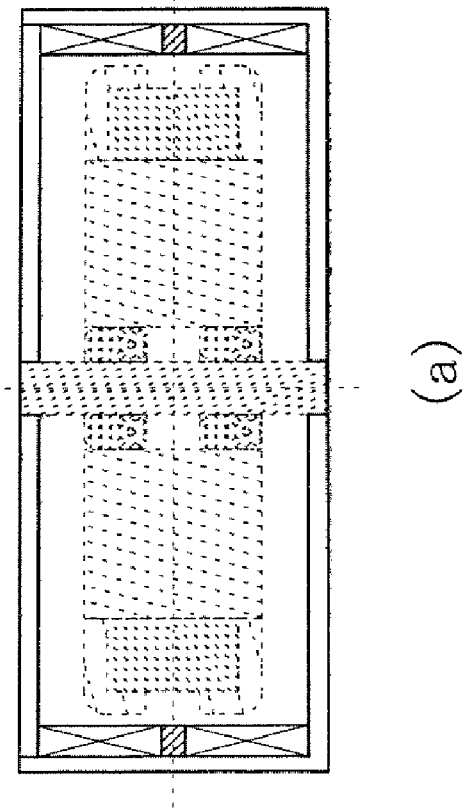
Figure 5:
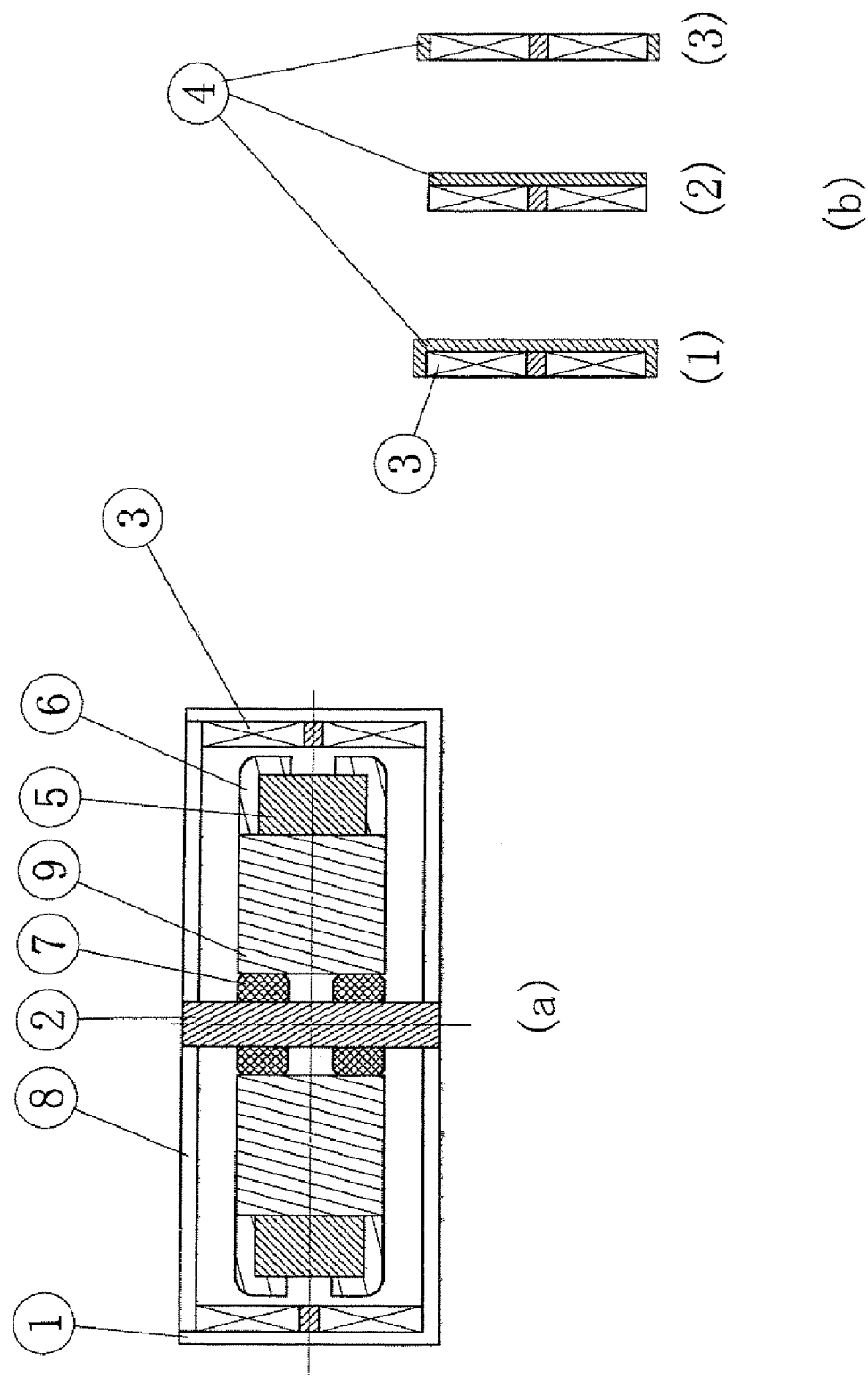
FIGS. 5A-5B are side cross-sectional views illustrating a coil yoke of the vibration actuator according to the first and second embodiments of the present invention.
Figure 6:
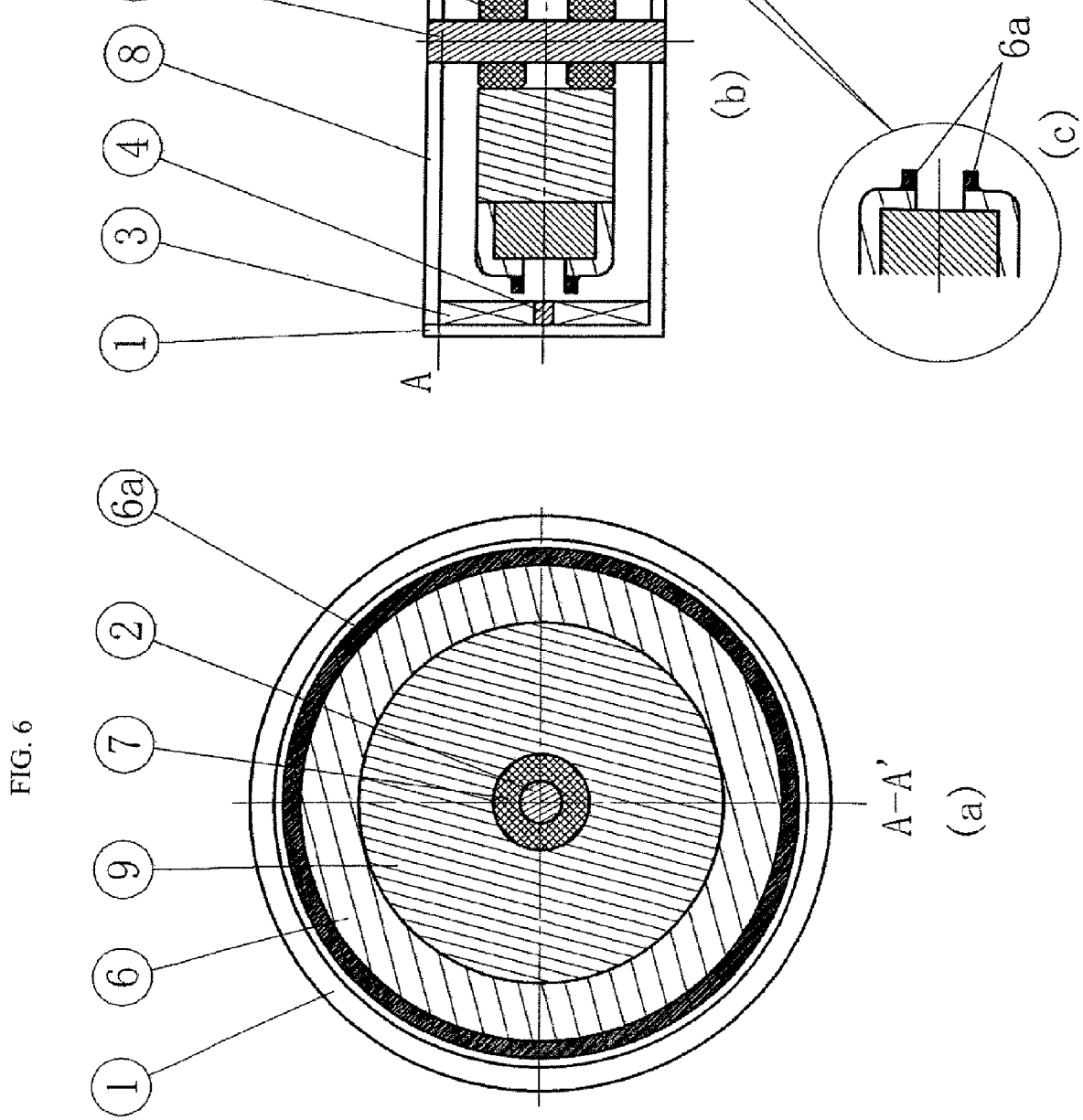
FIGS. 6A-6C cross-sectional views illustrating a protrusion provided to a magnet yoke of the vibration actuator according to the first and second embodiments of the present invention.
Figure 7:
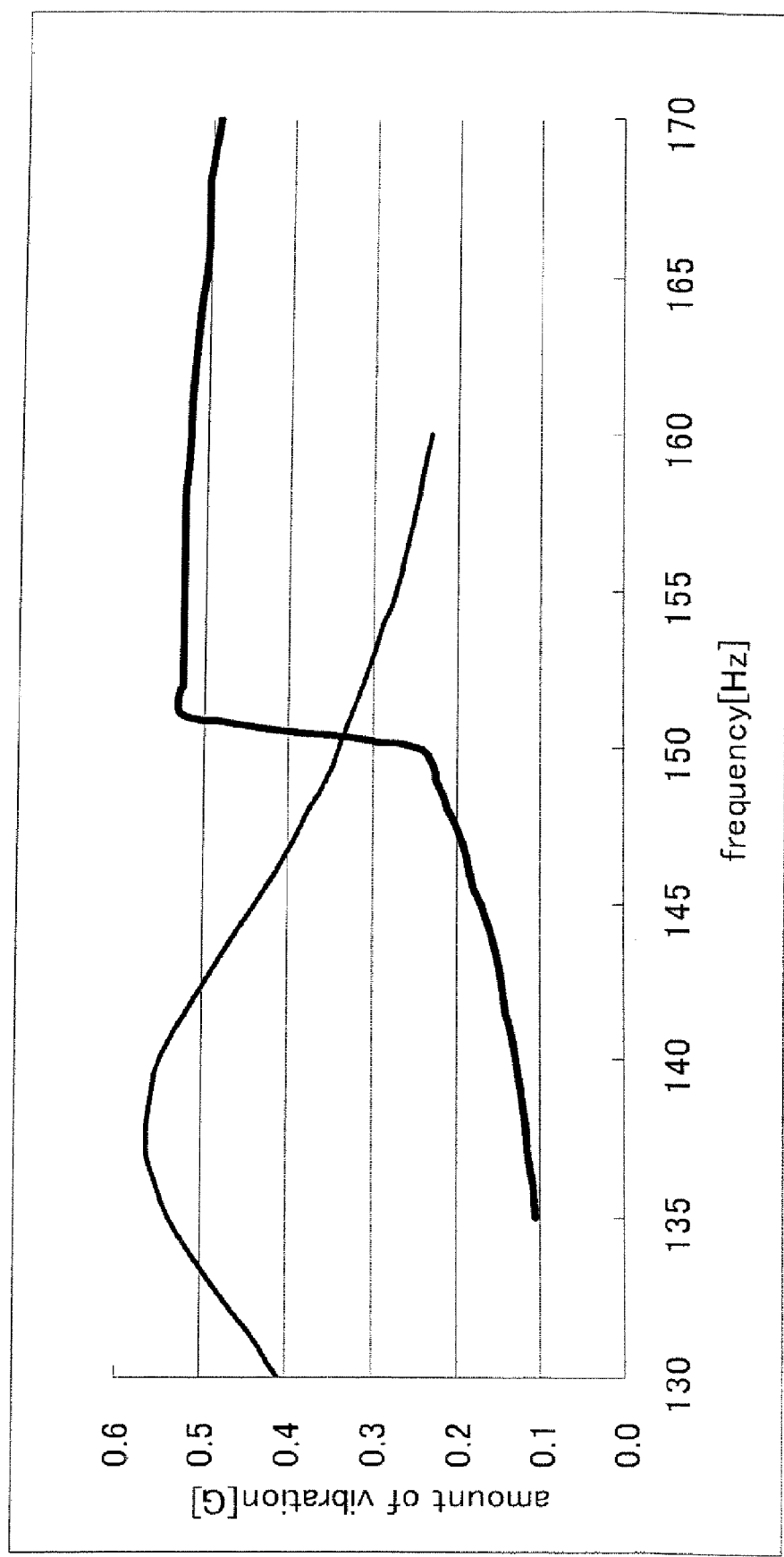
FIG. 7 is a graph illustrating frequency characteristics of the vibration actuator according to the present invention and a conventional vibration actuator.

1: case
2: shaft
3: coil
4: coil yoke
5: magnet
6: magnet yoke
6a: protrusion
7: shaft bearing
8: cover
9: weight
α: frequency characteristic of a vibration actuator according to the embodiment of the present invention
β: frequency characteristic of a conventional vibration actuator

The invention claimed is:

1. A vibration actuator comprising:
a moving part having a plate-shaped magnet magnetized in a vibration direction in a housing case, the moving part having a restricted movable range in the vibration direction,
a guide shaft onto which the moving part is movably mounted,
a field coil, and
a coil yoke made of a magnetic material, the field coil and the coil yoke are disposed around an outer surface of the magnet, and the field coil and the coil yoke are to generate a single magnetic pole around a central portion of a vibrational amplitude of the moving part during a period in which a current flows through the field coil,
wherein the moving part having the plate-shaped magnet is vibrated by interaction between a magnetic field generated by the field coil and a magnetic field generated by the plate-shaped magnet,
the moving part having the plate-shaped magnet includes two cup-shaped magnet yokes made of a magnetic material, each of the magnet yokes has a protrusion protruding radially from an outer circumferential portion of the plate-shaped magnet, and
the two magnet yokes formed to interpose the magnet to form a magnetic gap, providing a restriction in the amplitude of the vibration of the moving part by interacting magnetically with the field coil and the coil yoke.

2. The vibration actuator according to claim 1, wherein the field coil disposed around the moving part has a plate-shaped coil yoke made of magnetic material.

3. The vibration actuator according to claim 1, wherein a thickness of the magnetic gap formed in the two cup-shaped magnet yokes is 30% to 70% of the thickness of the plate-shaped magnet.

4. The vibration actuator according to claim 1, wherein a flow rate of the air is restrained by adjusting an interval between the outer circumferential portion of the magnet yoke and an inner wall of the housing which receives the moving pan or between the outer circumferential portion of the magnet yoke and an inner wall of the field coil.

5. The vibration actuator according to claim 2, wherein a thickness of the magnetic gap formed in the two cup-shaped magnet yokes is 30% to 70% of the thickness of the plate-shaped magnet.

6. The vibration actuator according to claim 2, wherein a flow rate of the air is restrained by adjusting an interval between the outer circumferential portion of the magnet yoke and an inner wall of the housing which receives the moving part or between the outer circumferential portion of the magnet yoke and an inner wall of the field coil.

7. The vibration actuator according to claim 3, wherein a flow rate of the air is restrained by adjusting an interval between the outer circumferential portion of the magnet yoke and an inner wall of the housing which receives the moving part or between the outer circumferential portion of the magnet yoke and an inner wall of the field coil.

\* \* \* \* \*